Oct. 18, 1949.  H. J. DE N. McCOLLUM  2,485,502
JET PROPULSION MEANS FOR HELICOPTERS
Filed April 12, 1945  2 Sheets-Sheet 1
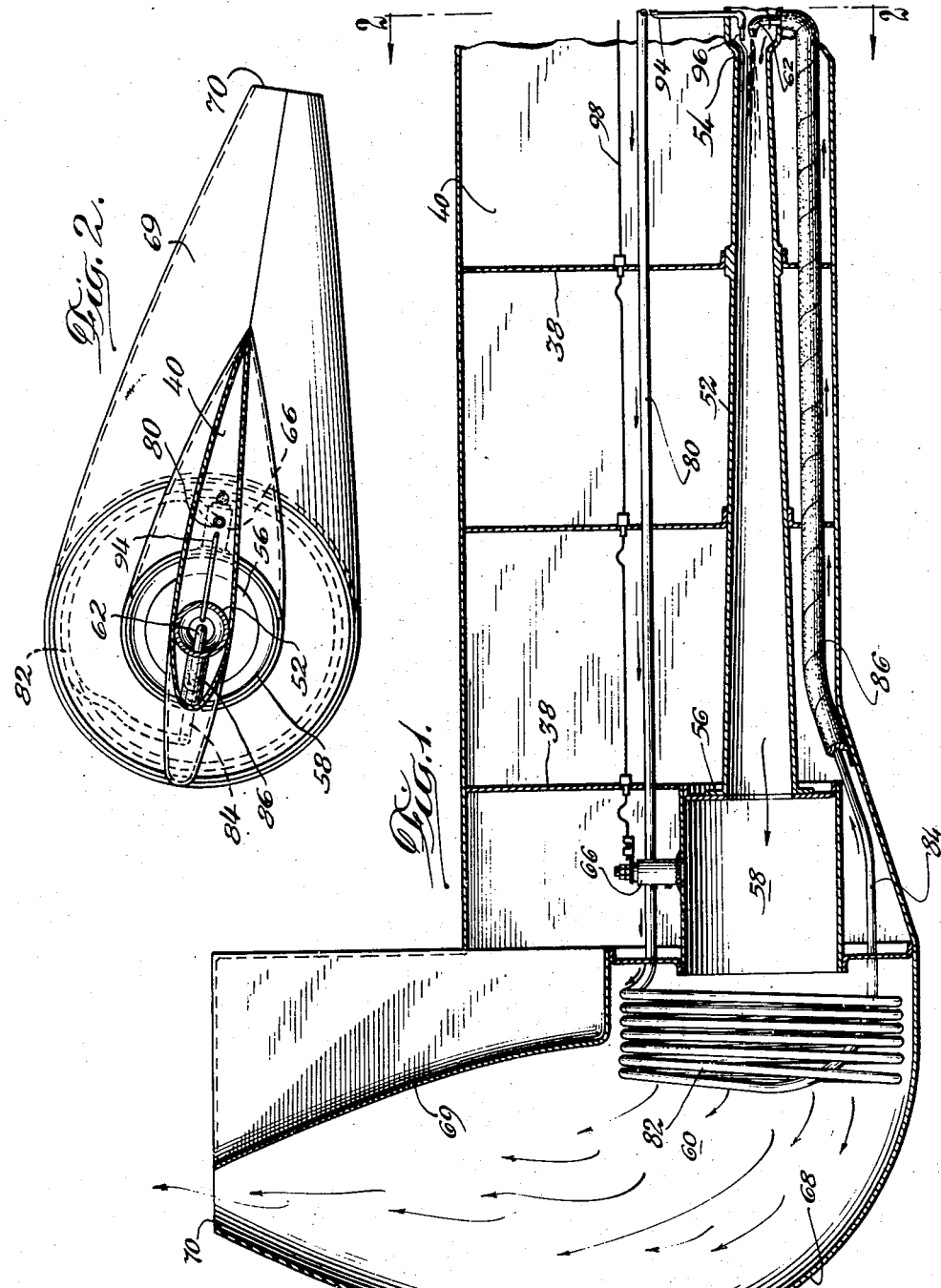

Oct. 18, 1949.  H. J. DE N. McCOLLUM  2,485,502
JET PROPULSION MEANS FOR HELICOPTERS
Filed April 12, 1945  2 Sheets-Sheet 2
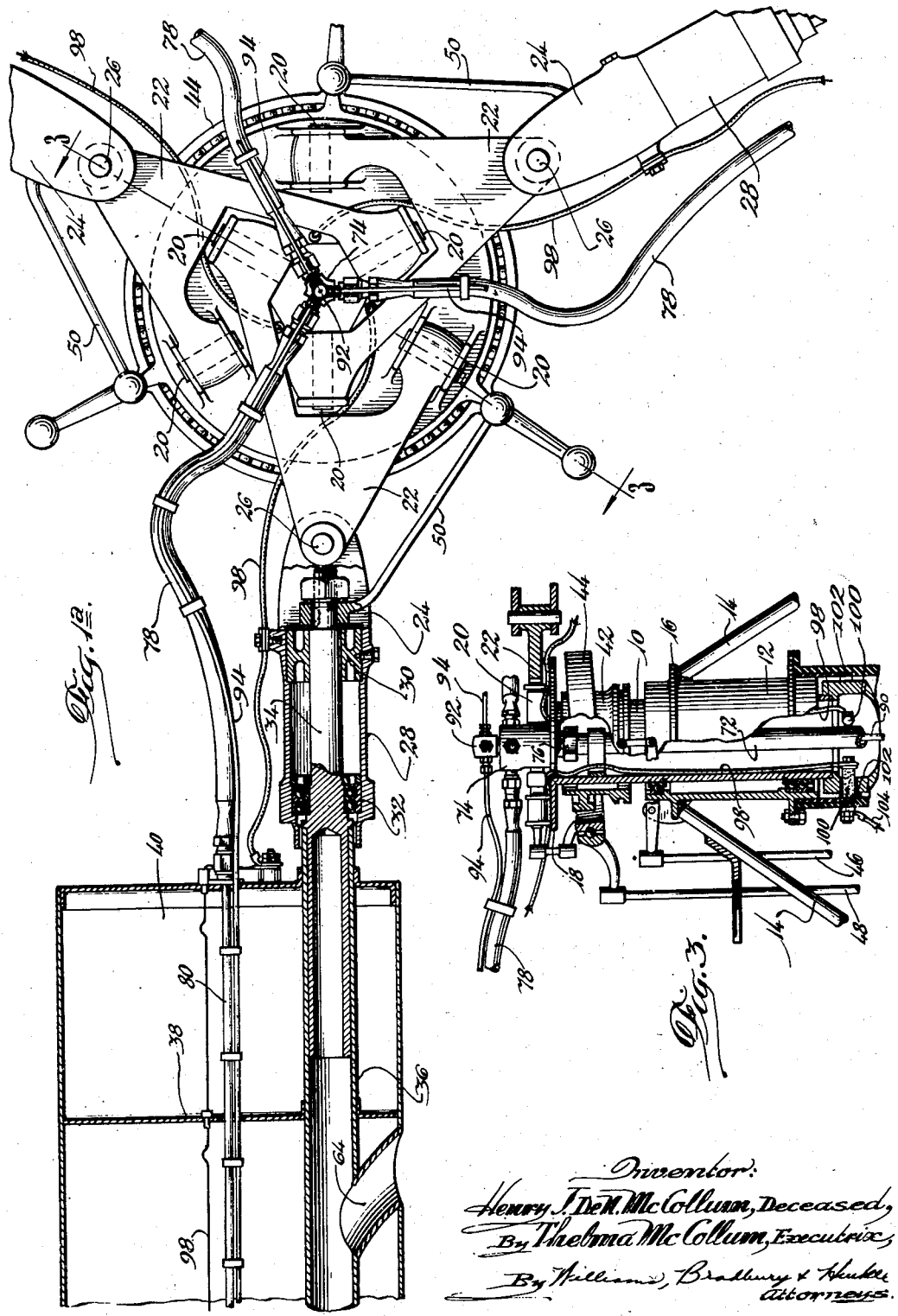
Inventor:
Henry J. De N. McCollum, Deceased,
By Thelma McCollum, Executrix,
By Williams, Bradbury & Hinkle
Attorneys.

Patented Oct. 18, 1949

2,485,502

UNITED STATES PATENT OFFICE 2,485,502

JET PROPULSION MEANS FOR HELICOPTERS

Henry J. DeN. McCollum, deceased, late of Chicago, Ill., by Thelma McCollum, executrix, Chicago, Ill., assignor to Stewart-Warner Corporation, Chicago, Ill., a corporation of Virginia Application April 12, 1945, Serial No. 587,928

3 Claims. (Cl. 170—135.4)

This invention relates to jet propulsion apparatus and particularly to an arrangement thereof adapted for use in a helicopter or similar aircraft.

One object of the invention is to provide a new and improved means for rotating the wings of a helicopter.

Another object of the invention is to provide a jet propulsion means for rotating the wings of a helicopter mounted in the wings themselves and thus dispensing with the necessity for transmitting power from a power plant in the fuselage for rotating the wings.

It is also an object of the invention to provide a new and improved jet propulsion apparatus designed to be located within the wing of an aircraft and to discharge its jet in a direction for driving the wing through the air.

More specifically, it is an object of the invention to provide means for driving a helicopter which includes a jet propulsion device carried by each wing with its jet nozzle directed in substantially tangential relation to its path of rotation so as to act efficiently in maintaining rotation of the wing.

Incidentally, it is an object of the invention to provide a new and improved driving means for helicopters which includes a jet propulsion apparatus enclosed within each of the hollow wings of a helicopter, each apparatus including an elongated mixing tube for fuel and air which serves also as a spar of the wing structure.

Other objects and advantages of the invention will appear from the following description taken in connection with the drawings, in which:

Fig. 1 is a horizontal sectional view of the outer end portion of a helicopter wing with a jet propulsion apparatus installed therein in accordance with this invention;

Fig. 1a is a continuation of Fig. 1 inwardly toward the axis of rotation of the wing showing the wing in horizontal section and showing the rotatable mounting therefor in top plane view together with fragments of the remaining wings of the helicopter.

Fig. 2 is a transverse section taken substantially as indicated at line 2—2 on Fig. 1;

Fig. 3 is a fragmentary elevation partly in section as indicated at line 3—3 on Fig. 1a, showing certain details of the rotatable wing mounting.

In the drawing the jet propulsion apparatus is shown applied to a helicopter of current design having three wings attached to a vertically disposed spindle 10 which is rotatably mounted in a tubular bearing member 12 from which it may be understood that the fuselage or body of the helicopter is suspended by suitable means such as the obliquely disposed brace rods 14, 14 extending downwardly from the flange 16 of the bearing tube 12. At the upper end of the spindle 10 a flange 18 thereon is provided with hinge connections 20 for the triangular yokes 22 to which each of the wings is attached, and each wing includes a bifurcated root portion 24 connected by a pivot 26 to one of the triangular yokes 22. The root 24 includes a tubular portion 28 having bearings 30, 32 for the stem or shaft 34 by which the wing itself is carried and as shown in Fig. 1a the stem 34 is telescopically and rigidly engaged in the tubular spar 36 which extends through the ribs or formers 38 of the wing 40.

Figure 3 shows the vertically shiftable ring 42 and the tiltable swash plate 44 on the spindle 10, together with operating rods 46 and 48 for adjusting these elements to vary the angular positions of all the wings and to swing each wing about the axis of its stem 34 for modifying its pitch during each rotation of the spindle 10, all in a manner which is well understood by those skilled in the art. Fig. 1a includes the radius arms 50 by which the shafts or stems 34 of the wings are connected to the swash plate 44.

In a conventional construction, the spindle 10 extends downwardly into the fuselage of the helicopter and is suitably geared for rotation by the engine mounted therein. In the present construction there is no such engine and each of the wings 40 carries its own power plant in the form of a jet propulsion device as shown in Figs. 1 and 2. The tubular spar 36 includes a portion 52 which continues through the outer end portion of the wing 40 and is shown with a constriction 54 from which the tube flares gradually toward its flanged outer end 56 at which it is attached to the end wall of a cylindrical combustion chamber 58 which in turn opens into the expansion chamber 60 of the jet propulsion apparatus. The tapered portion 52 with its constriction 54 thus constitutes a venturi serving as a mixing tube for vaporized fuel and air and adjacent the constriction there is located a fuel jet nozzle 62. At a short distance inwardly from the constriction 54 an air intake passage 64 opens from the leading edge of the wing 40 and connects into the tubular spar 36, thus constituting a ram for the introduction of air which is aspirated by the fuel jet at 62 to form a combustible mixture. This mixture is delivered by the mixing tube 52 to the combustion chamber 58 where an electrically energized igniter 66 initiates combustion which proceeds from the combustion chamber into and through the expansion chamber 60. As shown, the chamber 60 includes an outer wall 68 formed in a sweeping curve to direct the products of combustion substantially at right angles to the axis of the mixing tube 52 from which they enter. The opposite wall 69 of this chamber cooperates with the curved wall 68 to provide a gradually narrowing or tapered passage terminating in an exhaust opening to form the power jet nozzle 70. The powerful jet of the products of combustion issuing from the nozzle 70 is thus directed substantially at right angles to the longitudinal axis of the wing 40 and tangentially with respect to the path of rotation of the outer end of the wing and of the nozzle 70 itself as these parts swing about the axis of the spindle 10. With each wing of the helicopter equipped with a similar jet propulsion unit the wings are rotated and operate either for lifting the aircraft vertically or for causing its travel horizontally or in other directions, depending upon adjustment of the wings as controlled by the rods 46 and 48.

The fuel for operating the jet propulsion engines in the wings is supplied in liquid form through a feed pipe 72 which may be understood as extending from a suitable supply tank and pump located in the fuselage and not shown but adapted to furnish fuel under substantial pressure through the pipe 72 and to the distributing head 74 which is shown mounted upon the flange 18 of the spindle 10 for rotation therewith. Any suitable rotative coupling including a stuffing box such as indicated at 76 may be provided between the stationary feed pipe 72 and the rotatable head 74, and from the head 74 the liquid fuel is conveyed by flexible connecting tubes 78 to the feed pipes 80 in the individual wings. As shown in Fig. 1, the pipe 80 extends outwardly within the hollow structure of the wing 40 and is continued in a heat exchanger coil 82 located in the expansion chamber 60 and adjacent the combustion chamber 58 so that it is exposed continuously to the hot gases of combustion. In this way the liquid fuel flowing through the coil 82 is vaporized and substantially gasified and the resulting expansion of the fuel creates a very substantial pressure by which it is moved through a delivery pipe 84 preferably enclosed in a heat insulating jacket 86 and extending within the hollow wing 40 into connection with the jet nozzle 62. The fuel is thus expelled forcibly through the jet nozzle 62 toward the constriction 54 of the mixing tube 52. This insures adequate aspiration and compression of the air entering through the intake passage 64 and through intermixture of the air and fuel in traversing the elongated mixing tube 52.

Since the proper operation of the apparatus depends upon the preheating of the fuel in the heat exchanger 82 and this in turn requires heat to be generated in the combustion chamber 60, it is preferable to provide auxiliary means for initiating combustion and warming up the heat exchanger 82 sufficiently to vaporize the liquid fuel fed to it from the pipe 80 as soon as such fuel begins to flow into the heat exchanger. Such auxiliary means may include a tank of propane or similar highly volatile fuel stored under pressure in the fuselage of the helicopter with a feed pipe 90 leading from the tank. Such pipe may be disposed coaxially within the liquid fuel pipe 72, terminating in a distributor head 92 which surmounts the distributor 74 and from which individual feed pipes 94 extend to the wings of the helicopter. Each feed pipe 94 terminates in a nozzle 96 disposed adjacent the fuel jet nozzle 62 so that for initating combustion in the jet propulsion engines the auxiliary fuel supply will first be admitted to the jet nozzles 96 under the control of any suitable valve located in the fuselage and not shown. This highly volatile fuel escaping into the constriction 54 of the venturi 52 will aspirate sufficient air to provide a combustible mixture which will immediately ignite upon contact with the igniter 66 and will commence generating heat in the combustion chamber 60. Thereupon the regular liquid fuel, such as gasoline or other suitable liquid hydrocarbon, may be admitted to the pipe 72 and distributed to the jet nozzles 62 in the wings by way of the feed pipes 80 and heat exchangers 82, 84 in the several wings so that as this liquid fuel flows through the heat exchanger it will be vaporized and preheated for delivery at the nozzles 62. As soon as the flow of fuel through these nozzles is established, the auxiliary fuel supply through the pipe 90 may be shut off and by this time combustion will be proceeding at the normal rate resulting in the discharge of power jets from the nozzles 70 of the wings and in rotation of the wings themselves.

It may be understood that the source of electric current for energizing the igniter 66 is preferably located in the fuselage of the helicopter and as shown in Fig. 1 a feed wire 98 extends through each wing 40 and passes through a suitable opening in the flange 18 through the interior of the hollow spindle 10 for connection to a contact member 100 mounted to rotate with the spindle 10. The contact members 100 for the feed wires 98 of the several wings will continuously engage a contact ring 102 carried by the fixed bearing sleeve 12 and connected by a suitable conductor 104 to the source of current in the fuselage.

It may be noted that with the arrangement shown, in which the liquid fuel is conducted outwardly along each wing to the heat exchanger 82 therein, the centrifugal force resulting from the rotation of the helicopter wings will supply the liquid fuel to the heat exchanger under considerable pressure, which must be greater than the gas pressure built up in the heat exchanger and in the feed pipe 84 so as to insure discharge of the fuel at the nozzle 62 at high velocity; and the velocity of discharge at the nozzle 62 must be sufficient to overcome the back pressure resulting from the rapid expansion of the products of combustion in the chamber 60. However, the centrifugal force acting on the liquid fuel may of course be supplemented by adequate pump pressure for which a small auxiliary power plant may be provided in the helicopter fuselage. It is well known that a jet propulsion device is most efficient at relatively high speeds of travel; accordingly, the expansion chamber 60 and its jet outlet nozzle 70 are located preferably at the tip of the helicopter wing where the speed of travel of the wing relative to the surrounding air is greatest.

It will be recognized that jet propulsion apparatus of the type herein described need not be limited to the helicopter type of aircraft. Such jet engines may be installed in the wings of the conventional airplane with one or more jets in each wing. On the other hand, the broader aspect of the invention which involves providing a combustible mixture under pressure for use in a jet propulsion device by supplying fuel at a nozzle under pressure and releasing it at sufficient velocity to aspirate and compress the quantity of air required for combustion is disclosed and claimed in my aplication, Serial No. 587,926, filed April 12, 1945.

Incidentally, as shown in the drawings, the pipe 64 which delivers hot gas to the jet nozzle 62 is located in the vicinity of the leading edge of the helicopter wing and might be similarly located in an airplane of the fixed wing type so that by designing the insulating jacket 86 to confine only a portion of the heat tending to radiate from the pipe 84, the remainder of the heat would be aviable to prevent the formation of ice on the wing. It will be understood that this might involve the addition of more coils in the heat exchanger and that in any event the particular design illustrated herein is more or less diagrammatic and may be varied considerably to meet the engineering requirements of any particular design.

Although the apparatus herein shown and described is designed to be operated primarily by liquid hydrocarbon fuel, it will be manifest that under some conditions gaseous fuels under pressure may be utilized. For aircraft propulsion the gaseous fuel can be compressed in a tank on the ground, and the tank can then be loaded onto the aircraft and connected to the fuel line of the apparatus, dispensing with the pump required to feed liquid fuel from its tank. Or instead of using propane or some other fuel of high vapor pressure merely as an auxiliary for starting purposes, it may be employed as the principal fuel; assuming that, upon its release from a confining tank, this fuel will not develop the pressure needed to compress the air aspirated in the mixing tube, the additional pressure required can be provided by the heat exchanger through which the fuel will pass upon its release from its tank. Similarly a compressed gaseous fuel will be preheated and brought to a higher pressure by the heat exchanger before is is fed into the mixing tube.

While there is shown and described herein certain structure embodying the invention, it is to be understood that the invention is not limited thereto or thereby but may assume numerous other forms and includes all modifications, variations and equivalents coming within the scope of the following claims.

Having thus described the invention, what is claimed as new and desired to be secured by Letters Patent is:

1. In a helicopter wing mounted for rotation about an axis adjacent the inner end of the wing, a combustion chamber carried at the outer end of the wing and having an exhaust jet nozzle for the products of combustion directed tangentially with respect to its path of rotation about said axis, and means for supplying a combustible fuel mixture to said chamber, including an elongated mixing tube extending longitudinally of said wing to said combustion chamber with an air intake for said tube leading laterally into said tube near the inner end of the wing, a fuel nozzle discharging fuel vapor into said tube and toward the combustion chamber under pressure and at high velocity to aspirate the air and compress the resulting mixture on its way to the combustion chamber, the cross section of said tube increasing gradually toward the combustion chamber for reducing the velocity of the compressed mixture, a heat exchanger in the combustion chamber, means to supply liquid fuel to said heat exchanger under pressure whereby said fuel is vaporized and its velocity is increased, and a conduit for vaporized fuel leading from the heat exchanger to the fuel nozzle.

2. In a rotating wing aircraft, a power plant located in said wing including means to provide liquid fuel at high pressure, heat exchanger means for heating and vaporizing said fuel, a mixing tube having a wall tapered throughout at least a portion of its length, nozzle means to discharge vaporized fuel as a high velocity jet ajacent the smaller end of the tapered wall portion of said mixing tube whereby said jet is utilized to draw air into said mixing tube to form a high velocity combustible mixture, said tapered portion of the tube being of sufficient length to effect a reduction in the velocity of said mixture and an increase in its static pressure, a combustion chamber communicating with the larger end of said mixing tube for burning said mixture under pressure to provide compressed high temperature gases, said heat exchanger using a portion of the energy in said gases for heating and vaporizing the liquid fuel, and jet means for using another portion of said energy to rotate the wing of the aircraft by reaction.

3. In a rotating wing aircraft having a plurality of wings, a jet type power plant carried by each of said wings comprising jet producing means at the propeller blade tips, means for supplying said jet producing means with compressed high temperature gases including a combustion chamber, a mixing tube of elongated Venturi form, with one end larger than the other end, communicating at its larger end with said combustion chamber, means for supplying air to the smaller end of said tube, a fuel nozzle discharging into the constricted portion of said tube, means for supplying gaseous fuel at high velocity to said nozzle for aspirating air to form a combustible mixture at relatively high pressure including a heat exchanger in the combustion chamber, a conduit extending longitudinally of the wing for supplying liquid fuel to said heat exchanger under a pressure resulting at least in part from the effect of centrifugal force, and a conduit for conveying heated gaseous fuel from said heat exchanger to said nozzle.

THELMA McCOLLUM.
*Thelma McCollum, Executrix of the Last Will and Testament of Henry J. DeN. McCollum, Deceased.*

REFERENCES CITED

The following references are of record in the file of this patent:

UNITED STATES PATENTS

| Number | Name | Date |
|---|---|---|
| 1,099,083 | Duc | June 2, 1914 |
| 1,154,131 | Sands | Sept. 21, 1915 |
| 1,405,482 | Bostedo | Feb. 7, 1922 |
| 1,569,607 | Beck | Jan. 12, 1926 |
| 1,584,200 | Suplee | May 11, 1926 |
| 1,897,092 | Weir | Feb. 14, 1933 |
| 1,932,702 | Langdon | Oct. 31, 1933 |
| 2,142,601 | Bleecker | Jan. 3, 1939 |
| 2,330,056 | Howard | Sept. 21, 1943 |
| 2,397,357 | Kundig | Mar. 26, 1946 |

FOREIGN PATENTS

| Number | Country | Date |
|---|---|---|
| 227,151 | Great Britain | Jan. 12, 1925 |
| 275,677 | Great Britain | Mar. 22, 1928 |
| 366,450 | Great Britain | July 30, 1930 |
| 423,590 | France | Feb. 20, 1911 |
| 523,468 | Great Britain | July 15, 1940 |
| 556,866 | Great Britain | Oct. 26, 1943 |
| 859,640 | France | June 10, 1940 |